Dec. 26, 1944.    A. W. HANSON    2,365,952
MACHINE FOR MAKING PLASTIC HELICOIDAL STRUCTURES
Filed March 12, 1942    2 Sheets-Sheet 1

INVENTOR.
Alden W. Hanson
BY
Griswold & Burdick
ATTORNEYS

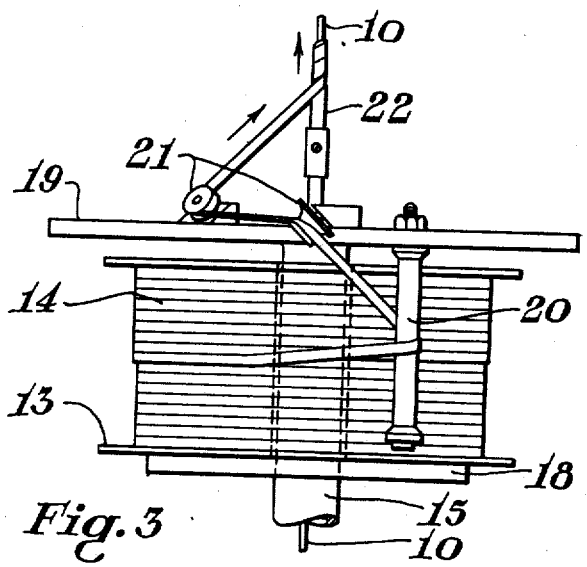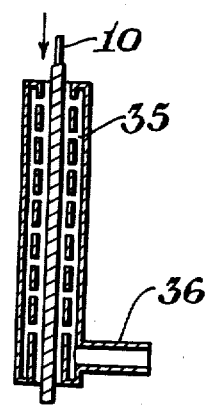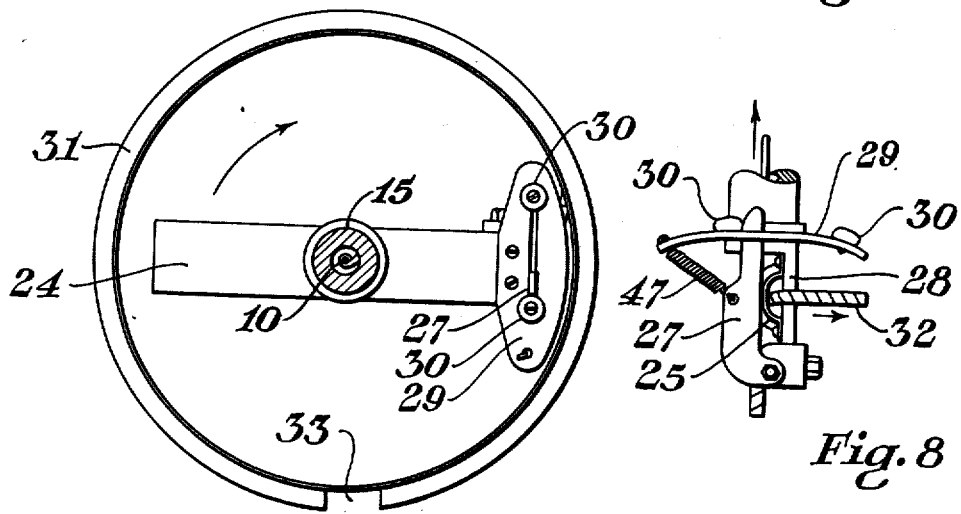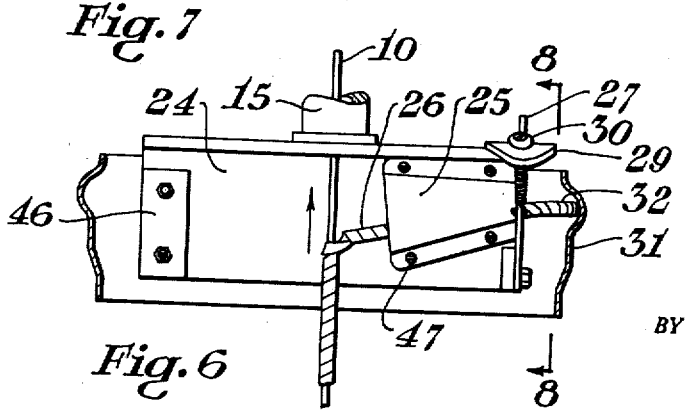
INVENTOR.
Alden W. Hanson
BY
Griswold & Burdick
ATTORNEYS Patented Dec. 26, 1944

2,365,952

UNITED STATES PATENT OFFICE 2,365,952

MACHINE FOR MAKING PLASTIC HELICOIDAL STRUCTURES

Alden W. Hanson, Midland, Mich., assignor to The Dow Chemical Company, Midland, Mich., a corporation of Michigan Application March 12, 1942, Serial No. 434,424

2 Claims. (Cl. 18—1)

This invention relates to machinery for making plastic helicoidal structures.

Plastic helicoidal structures are used extensively as guards and wrappings for telephone cords and similar flexible assemblages to prevent knotting and kinking, as spacers in coaxial structures of various sorts, as insulators and for decorative and other purposes. They have heretofore usually been made by winding a length of plastic material of uniform rectangular cross-section evenly around a rigid mandrel without overlapping successive coils and heating, or otherwise treating it on the mandrel to set it. The structure thus formed is then stripped from the mandrel by unwrapping it or by sliding it off the end of the mandrel. This and similar processes which have been suggested necessitate considerable handling of the material in process, do not permit of rapid or of continuous production of these structures, and are generally expensive to operate.

It is, therefore, an object of this invention to provide a process or method whereby plastic helicoidal structures may be produced conveniently, continuously, and at low cost. An additional object of the invention is to provide machinery of simple construction for continuously producing such plastic helicoidal structures.

The foregoing and related objects are readily accomplished by continuously winding a plastic tape around a traveling flexible, endless mandrel, heating the wound tape on the traveling mandrel to set it, and subsequently continuously unwinding the formed helicoidal structure from the traveling mandrel. After being unwound from the mandrel, the helicoidal structure may be severed into sections of desired length as by an automatically operated cut-off knife.

Reference is made to the accompanying drawings in which, in the interest of clarity, certain features are shown on a somewhat exaggerated scale.

Figure 3 is a diagrammatic elevation of the supply reel and winding assemblage shown in Figure 2, but on a somewhat larger scale.

Figure 4 is an elevation of the tape positioning member shown in Figure 3, but on a somewhat larger scale.

Figure 5 is a sectional elevation of the heater shown in Figure 2.

Figure 6 is a sectional elevation of the assemblage for unwinding and severing the helicoidal structure.

Figure 7 is a plan view of the unwinding and severing assemblage shown in Figure 6.

Figure 8 is an elevation of the unwinding and severing assemblage taken on the line 8 of Figure 6.

Figure 1:
Figure 1 is a plan view illustrating a helicoidal structure which the method and apparatus herein described are adapted to produce.

The helicoidal structure, Figure 1, produced by the method and machinery of the present invention is characterized by several advantageous features when compared with similar structures produced in the conventional discontinuous manner. These features include uniformity of coil diameter, even spacing of the coils, and lack of distortion of the individual coils, such as may result from stretching, uneven heating, etc., during conventional winding and heating operations.

The apparatus illustrated in Figures 2 to 8 includes, generally, a traveling endless mandrel, rotatable means for winding a plastic tape thereon, means to heat the tape while wound on the mandrel to set it in helicoidal form, means to unwind the formed helicoidal structure from the traveling mandrel, means to sever the unwound helicoidal structure at predetermined intervals, and, drive means to move the mandrel, winding, unwinding and severing means in synchronism. The winding means, and unwinding and severing means may conveniently be mounted on a rotatable hollow shaft longitudinally coaxial with the mandrel in such manner that the shaft and means mounted thereon may rotate while the mandrel travels through the hollow shaft.

Figure 2:
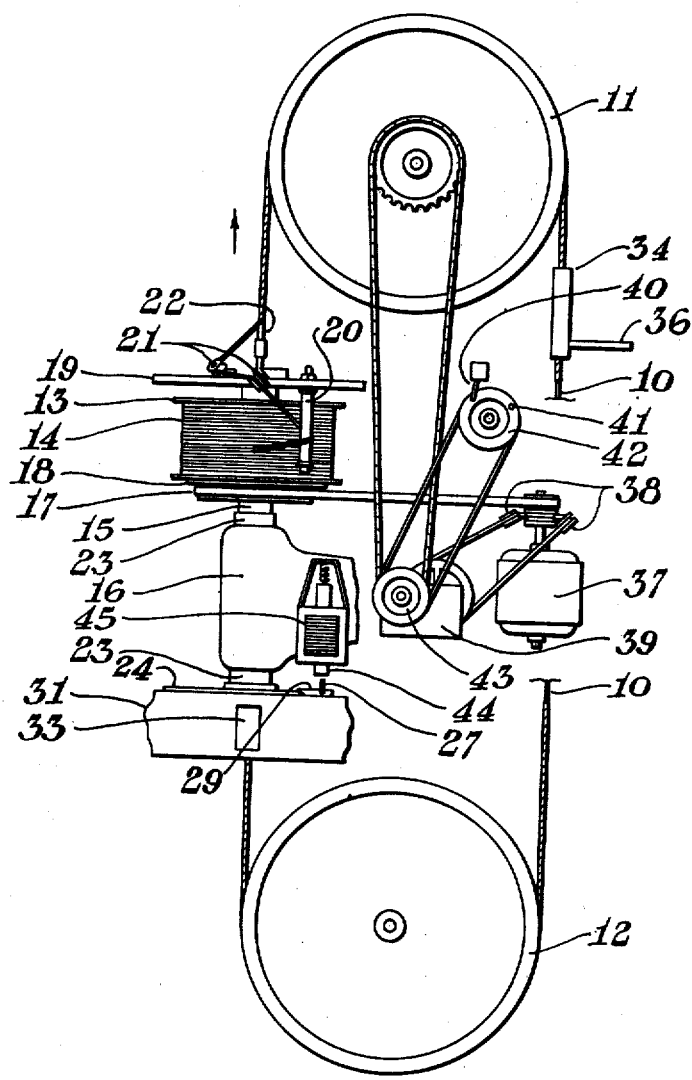
Figure 2 is a diagrammatic elevation illustrating apparatus in which the sequence of operations is performed in the manufacture of helicoidal structures by the method of the present invention.

Referring now to Figure 2, a flexible endless mandrel 10 (with section cut away to show driving means clearly) travels over a driven pulley 11, preferably grooved to receive the mandrel, and an idler pulley 12 which may also serve as a tensioning pulley. The mandrel may conveniently consist of a flexible steel cable which may, if desired, be covered with cloth or other suitable material. The mandrel is preferably jointed so that it may be easily disassembled, e. g., for inserting a new reel 13, hereinafter described, carrying a fresh supply of plastic tape 14. Such joint should be as smooth as possible so as to cause no unevenness in the helicoidal structure formed by winding the plastic tape around the jointed and neighboring portions of the mandrel and should, of course, not impede the travel of the mandrel around the driven and idler pulleys heretofore mentioned. In the case of a metal mandrel of small cross section it is usually satisfactory to simply solder the two ends together and to then heat the soldered joint when it is desired to disassemble the mandrel. Other satisfactory jointing means are apparent. Mandrels having other than a circular transverse cross-section, e. g., having an oval transverse cross-section, may be used, if desired, although it is desirable to avoid the use of mandrels having angular edges.

A rotatable hollow shaft 15 positioned coaxially around a portion of the mandrel between the driven pulley 11 and the idler pulley 12 is mounted in bearings in a suitably positioned housing 16 (housing support not shown). The inside diameter of the hollow shaft is sufficiently large to permit clearance of the mandrel traveling through it.

The rotatable shaft 15 has mounted thereon: a driven pulley 17 secured as by a key or set-screw (not shown) whereby the shaft 15 and mountings are rotated; a reel supporting plate 18 which serves to support a free-running reel 13 carrying a supply of plastic tape 14; a removable guide supporting plate 19 secured as by a set-screw (not shown) and having mounted thereon a tape guiding assemblage including a guide post 20 and suitably placed idler pulleys 21 for guiding the plastic tape 14 from the reel 13 to the traveling mandrel 10, and a tape positioning member 22 coaxial with the mandrel 10 for accurately positioning the tape 14 on the mandrel 10 as it is wound thereon; suitable collars 23 to prevent end play of the rotatable shaft; and an unwinding and severing assemblage, as shown in Figure 6 including a supporting arm 24, a guiding sleeve 25 for the unwound helicoidal structure 26, a spring tensioned, pivotally mounted severing knife 27, a shear plate 28 of Figure 8 which may conveniently be the end of the supporting arm 24, a slotted knife guiding plate 29 and adjustable stops 30 for controlling the path and length of travel of the severing knife 27. A stationary circular guard 31 (support not shown) is positioned around but not in contact with, the unwinding and severing assemblage. The plastic helicoidal structure 26 issuing from the guiding sleeve 25 passes between the cut-off knife 27 and the shear plate 28 and is dragged along the inner surface of the circular guard 31, preferably in a groove therein, until such time as a section 32 is cut off by the severing knife 27, at which time, due to its momentum, the severed section is ejected through a suitably placed port 33 of Figure 2 in the circular guard 31 and may be collected in any suitable receptacle.

A stationary heater 34 of Figure 2 is shown in detail in Figure 5. A suitable tubular hollow chamber having a perforated inner wall 35 and connected to a source of steam or hot air as by a pipe 36, is positioned coaxially around, but not in contact with, the mandrel 10 at a point where steam or hot air issuing from the ports in the inner wall of the heater will serve to heat the previously wound plastic tape as it is carried on the traveling mandrel through the heating zone, thereby setting the plastic tape in a helicoidal form. A motor 37 of Figure 2 or other source of power serves to drive the driven pulley 17 mounted on the rotatable shaft 15 and, also, by way of suitable idler pulleys 38 and a variable speed controller 39, the driven pulley 11 which serves to cause the mandrel 10 to travel. A spring switch 40 in an electrical circuit is closed at predetermined intervals, e. g., by a projecting pin 41 on a variable speed driven pulley 42 synchronized with the mandrel 10 as by a variable speed drive pulley 43 keyed to the power output shaft of the variable speed controller 39, actuates a solenoid-operated, spring-tensioned plunger 44 so positioned, e. g., mounted on the rotary shaft housing 16, that when the solenoid 45 is actuated, the plunger is thrown into position where the severing knife 27 strikes it as the unwinding and severing assemblage rotates around the mandrel, thus depressing the knife 27 and severing the plastic helicoidal structure issuing from the guiding sleeve 25 of Figure 6.

Referring now to Figure 3, the operation of the winding assemblage will be described. The reel supporting plate 18 as it rotates, along with the rotatable shaft 15, carries the free-running reel 13 with it so that the speed of rotation of the reel is the same as that of the reel supporting plate when the plastic tape 14 is not being withdrawn from it. However, since the reel 13 merely rests upon the reel supporting plate 18, it is free to turn thereon and will do so to an extent determined by the amount of plastic tape withdrawn from it. The plastic tape passes around a guide post 20 and over suitably placed idler pulleys 21 mounted on the guide supporting plate 19, said guide post and idler pulleys thus serving to wind the tape around the traveling mandrel as the rotatable shaft is rotated. The tape positioning member 22, shown in enlarged detail in Figure 4, serves to position accurately the tape on the traveling mandrel 10, assuring even spacing of the coils thereon. Tapes of a variety of transverse cross-sectional shapes, e. g., rectangular, circular, oval, half-round, etc., may be used.

Referring to Figure 6, the operation of the unwinding and severing assemblage will be described in detail. The assemblage rotates with the rotatable shaft 15, previously referred to, within the stationary circular guard 31. The supporting member of the unwinding and severing assemblage may conveniently include an angle-shaped member or arm 24 of appropriate length, welded or otherwise attached to the end of the rotatable shaft 15 and may have a counter-weight 46 attached to one end for balancing purposes. A guide sleeve 25 attached near the opposite end of the supporting arm, such as by screws 47 serves as a guide for the plastic helicoidal structure 26 as it is unwound from the traveling mandrel 10 by the rotation of the assemblage. Due to centrifugal force the unwound helicoidal structure 26 tends to extend in a straight line away from the mandrel, and it therefore travels through the guide 25 as fast as it is unwound from the mandrel. The portion of the helicoidal structure which has issued from the guide 25 is dragged along the inner surface of the stationary guard 31 until it is severed by the cut-off knife 27.

Referring now to Figure 8, the severing knife 27 of the rotating severing assemblage is depressed at predetermined intervals by contact with the solenoid actuated plunger 44 shown in Figure 2, and moves past the shear plate 28, thus severing the section 32 of the helicoidal structure. The end of the severing knife 27 which contacts the plunger 44 may be beveled so that the knife slides smoothly under the plunger. The knife is then returned to its original position by a spring 47. The knife is guided by the slot in the knife guide plate 29, shown in greater detail in Figure 7, and the limits of its travel are controlled by a pair of adjustable stops 30.

Upon being severed, the severed section of the helicoidal structure tends to straighten out and, due to its momentum, continues to slide around the inner surface of the guard 31 until it is ejected through the port 33.

In a specific instance, it was desired to make a number of helicoidal structures 36 inches long by 0.23 inch inside diameter from a thermoplastic ethyl cellulose tape of rectangular cross-section 0.02 inch thick by 0.25 inch wide. It was also desired to have the coils of the helicoidal structure as close together as possible. Accordingly, a reel carrying a supply of the thermoplastic tape was placed upon the reel support plate. The guide support plate with attached guide post, idler pulleys and tape positioning member was then mounted on the rotatable shaft. The ends of the mandrel, which consisted of a steel cable of circular cross-section 0.23 inch in diameter, were then soldered together, and the tape was fed around the guide post, over the idler pulleys and wound several times around the mandrel the last coil being carefully drawn over the tape positioning member. The end of the tape was tied to the mandrel to keep it from unwinding. The variable speed reducer was then adjusted so that the rotary shaft and the members mounted thereon rotated around the mandrel four times for each inch that the mandrel traveled. The speed of the pulley carrying the pin for closing the spring switch was then adjusted so that the spring switch was caused to make contact in the electrical circuit for each 36 inches of travel of the mandrel. Low pressure steam was admitted to the heater and the machine was then run slowly until the portion of the mandrel having the end of the tape tied to it reached the unwinding and severing assemblage. The machine was then stopped and several inches of the plastic helicoidally wound tape were unwound from the mandrel and fed into the guide. The machine was then again started and run at a speed which caused the rotatable shaft to rotate at a rate of about 600 revolutions per minute. Sections of the formed plastic helicoidal structure 36 inches long by 0.23 inch in internal diameter and having the separate coils touching each other were ejected regularly from the port in the side of the guard around the unwinding and severing assemblage at a rate slightly in excess of 4 per minute. The operation was continued until the supply of plastic tape on the reel was exhausted. The helicoidal structures thus obtained were found to have uniform internal diameters, uniform spacing of the coils, and uniform length.

I claim:

1. In a machine for continuously making a flexible, helicoidal structure from a plastic tape, the combination of: an endless, flexible, traveling mandrel; a rotatable hollow shaft longitudinally coaxial with the traveling mandrel, said shaft having mounted thereon and rotatable therewith a reel support plate adapted to support a free-running reel carrying a supply of plastic tape, winding means adapted to wind said plastic tape on said traveling mandrel, unwinding and severing means adapted to unwind the formed flexible helicoidal structure from the mandrel and to sever the unwound structure into sections of predetermined length; and, stationary heating means adapted to heat the tape while wound on the traveling mandrel.

2. In a machine for continuously making a flexible, helicoidal structure from a plastic tape, the combination of: an endless, flexible, traveling mandrel; a rotatable hollow shaft longitudinally coaxial with the traveling mandrel, said shaft having mounted thereon, and rotatable therewith, a reel support plate adapted to support a free-running reel carrying a supply of plastic tape, winding means adapted to wind said plastic tape on said traveling mandrel, unwinding and severing means adapted to unwind the formed flexible helicoidal structure from the mandrel and to sever the unwound structure into sections of predetermined length; stationary heating means adapted to heat the tape while wound on the traveling mandrel; means to actuate said severing means when a section of flexible helicoidal structure of predetermined length has been unwound from the mandrel; and, means to drive the rotatable shaft and traveling mandrel synchronously.

ALDEN W. HANSON.